(12) United States Patent
Wood et al.

(10) Patent No.: US 6,875,917 B1
(45) Date of Patent: Apr. 5, 2005

(54) UTILITY LINE POLE HAVING ALIGNMENT INDICATOR AND ASSOCIATED METHODS

(75) Inventors: Eugene H. Wood, Hickory, NC (US); Michael G. Nolte, Hickory, NC (US); David A. Franklin, Morganton, NC (US)

(73) Assignee: Utility Solutions, Inc., Hickory, NC (US)

( * ) Notice: Subject to any disclaimer, the term of this patent is extended or adjusted under 35 U.S.C. 154(b) by 0 days.

(21) Appl. No.: 10/743,888

(22) Filed: Dec. 22, 2003

(51) Int. Cl.$^7$ ................................................ H02G 3/04
(52) U.S. Cl. ................... 174/48; 174/68.1; 174/68.3; 174/45 R; 174/38; 52/220.1
(58) Field of Search ................... 174/48, 49, 68.1, 174/68.3, 44, 45 R, 40 R, 38; 52/40, 220.1, 726.4

(56) References Cited

U.S. PATENT DOCUMENTS

| | | | |
|---|---|---|---|
| 3,596,946 A | 8/1971 | Burton | |
| 3,788,691 A | 1/1974 | McMullin | |
| 3,889,044 A | * 6/1975 | Flachbarth et al. | 174/48 |
| 4,121,531 A | 10/1978 | Norton | |
| 4,284,840 A | * 8/1981 | Baker | 174/48 |
| 4,373,111 A | * 2/1983 | Myers et al. | 174/48 |
| 4,424,987 A | 1/1984 | Ryder | |
| 4,902,852 A | * 2/1990 | Wuertz | 174/48 |
| 5,694,695 A | 12/1997 | Lund | |
| 6,167,673 B1 | * 1/2001 | Fournier | 52/726.4 |
| 6,213,672 B1 | 4/2001 | Varga | |
| 6,382,583 B1 | * 5/2002 | Hill et al. | 248/548 |
| 6,446,408 B1 | 9/2002 | Gordin et al. | |
| 6,497,081 B1 | * 12/2002 | Raasch | 52/736.1 |
| 6,626,406 B1 | * 9/2003 | Olson, Jr. | 248/219.3 |

FOREIGN PATENT DOCUMENTS

GB    2181946 A  *  5/1987  ............ A47D/9/00

* cited by examiner

*Primary Examiner*—Dhiru R. Patel
(74) *Attorney, Agent, or Firm*—Bracewell & Patterson, LLP; Jeffrey S. Whittle

(57) ABSTRACT

A portable utility power line pole and associated methods of assembly and use are provided. The portable utility power line pole includes a pole body adapted to be held in the hand of a user. The portable utility power line pole also can include a tool connector adapted to mount a utility power line tool for use in association with electrical power distribution lines. An alignment indicator in the form of a visible line is positioned on an outer surface of the pole body in alignment with the tool connector to provide the user visualization of a user selected orientation of the utility power line tool when mounted on the tool connector and when the user manipulates the portable utility power line pole at a proximal end of the pole body to select the orientation of the utility power line tool.

30 Claims, 5 Drawing Sheets

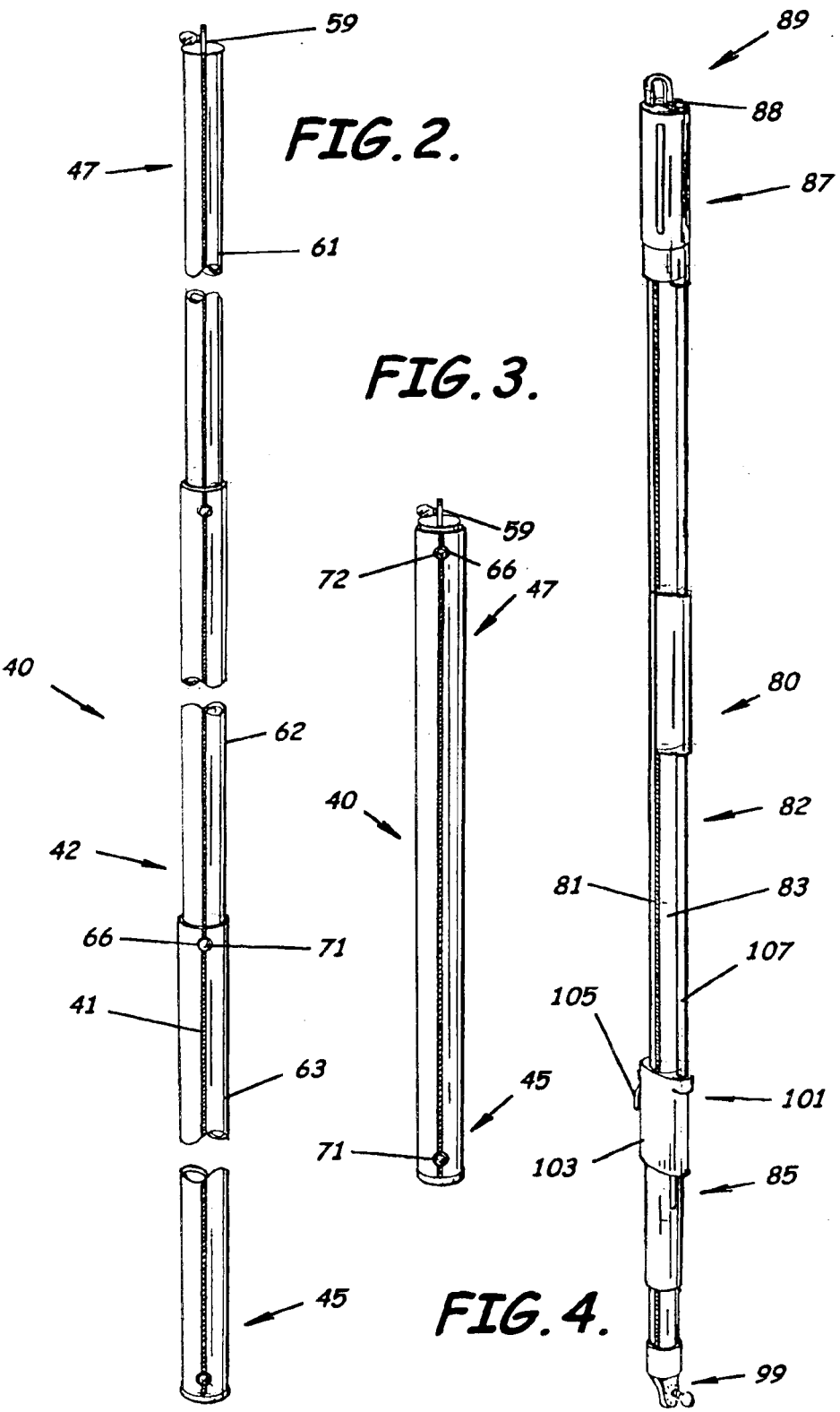

UTILITY LINE POLE HAVING ALIGNMENT INDICATOR AND ASSOCIATED METHODS

BACKGROUND OF THE INVENTION

1. Field of the Invention

The present invention relates generally to portable extension poles. In more specific aspects, the present invention relates to portable poles used in the electrical distribution system field and methods associated therewith.

2. Description of the Related Art

The accessibility of electrical power distribution lines varies substantially because the lines are installed both above ground at various elevations and below ground in underground electric power distribution systems. As a result of such a highly diverse and non-uniform manner in which the electrical power distribution lines are positioned and mounted, the access distances between the electrical power distribution lines and the maintenance personnel vary substantially. For example, an above ground electrical power distribution line may be 10 feet or more from the maintenance person thus requiring a pole of at least 10 feet in length in order to reach the line. On the other hand, a below ground electrical power distribution line may be only 5 feet or less from the maintenance person, thus requiring a much shorter pole than would be required for the above ground scenario. In order to be properly prepared under such highly diverse and nonuniform conditions, maintenance personnel have been typically provided telescoping poles (sticks) or a selection of poles of varying lengths in order to properly accomplish various tasks without being required to go back to homebase to obtain a properly sized portable electrical power distribution line pole.

Telescoping poles are well known in the art and have been used for a great number of fields including the electrical power distribution field as one methodology in meeting the needs of the maintenance personnel faced with the possibility of such highly diverse and nonuniform reach distances. The use of telescoping poles is often preferred over the use of various non-telescoping or fixedly sized poles, except in certain exceptions some of which are described below, as they tend to conserve space. The telescoping poles are generally constructed from a plurality of individual telescoping sections that are generally relatively short in length and circular in cross section. By their nature, the individual telescoping sections fit one inside the other when not in use, i.e., an inner pole is disposed within an outer pole having a larger diameter than that of the inner pole. Such telescoping-type poles generally permit a selected number of sections to be extended to provide the maintenance personnel a pole of the required length.

An important feature of telescoping poles is the ability to lock individual sections of the pole at a desired telescoped extension length by means of a locking pin, button, screw, or other such fastener. Thus, the individual sections of the telescoping poles typically include a connector to lock an internal pole within the outer pole, locking select individual sections together to permit the extension of the individual sections and selective adjustment of the overall length of the telescoping pole. For example, each of the individual sections can have a spring-biased button which passes through a hole formed in an adjacent outer cylindrical section. When the hole and the button engage, the pole is mechanically locked into position and can be released by manual pressure on the button. The means for locking the individual sections of the telescoping pole can, however, be problematic. For example, when a user tries to extend or retract individual sections of the telescoping pole, the inner pole sections often tend to rotate with respect to an adjacent outer pole segment. This rotation typically results in a misalignment of the button of the inner pole section with the corresponding hole in the adjacent outer pole section which prevents engagement of the hole with the button. The user typically cannot see the button of the inner pole section and must radially twist the two pole sections relative to each other to "feel" for the button in order to align the button with the hole of the adjacent outer pole section until engagement occurs. This problem is exacerbated when trying to retract all of the pole sections such that a single button engages each of the holes of corresponding adjacent outer pole sections. The user must successively align the button on the innermost pole section with holes in each of the outermost pole sections which then also must align with each other.

Various strategies to overcome this problem with respect to various types of telescoping poles not necessarily to use on electrical distribution lines have included the use of alignment marks in the form of a notch or some other indicia. These markings, however, tend to be difficult for maintenance personnel to see, especially when faced with bad weather or low-light conditions. These markings also have been shown to be even less effective when used to align the poles during retraction. Applicant has, therefore, recognized a need for a telescoping pole for use with the electrical power distribution lines that provides alignment indicators on each pole section that align with each other to further enhance the ease of alignment of the respective telescoping pole sections during both extension and retraction.

Another significant feature of the telescoping pole is the ability to manipulate a tool at the farthest most end of a pole section with the telescoping pole either partially or fully extended. Often, maintenance personnel have faced difficulty in manipulating the tool due to the distance between the eyes of the user and the tool itself, the chief complaint being that it is difficult to visualize the direction (spatial orientation) of the tool at the end of the telescoping pole. The maintenance personnel have typically attempted to overcome this difficulty by positioning the telescoping pole close to the ground and rotating the pole to orient the tool in a specific reference orientation and then attempt to maintain the tool in that position by not rotating the pole while repositioning the tool adjacent the area of interest. This has proved only marginally successful as the telescoping pole is often inadvertently rotated during the repositioning process. Correspondingly, Applicant has, therefore, also recognized a need for a telescoping pole for use with the electrical power distribution lines that provides alignment indicators on the nearest most pole section to provide the user continuous visualization of the direction of the utility power line tool at its farthest most end when manipulating the telescoping pole at its nearest most end.

As stated above, in some electrical power line distribution maintenance procedures, such as when installing "hot line" clamps, the typical telescoping pole is not typically used in favor of use of a heavier gauge pole having an insulated head section often referred to as a clamps stick or a shotgun stick. The shotgun stick includes a hook or jaw generally positioned within the insulated head section and capable of gripping a clamp or another tool. When used with respect to a hot line clamp, the hook or jaw will be opened to release the clamp. In such position, the hook extends outwardly and radially from the insulated head section. The shotgun stick can be fairly long and thus succumbs to the same problem described above with respect to the telescoping pole. When used to manipulate a tool, maintenance personnel face difficulty due to the distance between their eyes and the tool itself. As with telescoping poles, the chief complaint is that it is difficult to visualize the direction or spatial orientation of the tool at the end of the pole. When used to install a hot line clamp, maintenance personnel are faced with even greater difficulty because of the necessity for knowing the radial direction the hook or jaw will extend prior to releasing the clamp. As with the visualization problem described with respect to telescoping poles, the maintenance personnel have typically attempted to maintain spatial orientation of the head section by propositioning the orientation of the head section with the head section close to the ground, using that initial position in an attempt to maintain spatial orientation of the head unit while positioned adjacent the electrical power distribution lines. This too has also proved only marginally successful. Thus, as inherently stated above, Applicant has recognized a need for various length poles for use with the electrical power distribution lines that have an alignment indicator to provide the user continuous visualization of the direction of the utility power line tool at its farthest most end when manipulating the pole at its nearest most end.

SUMMARY OF THE INVENTION

With the foregoing in mind, embodiments of the present invention advantageously provide a portable utility power line pole for use with electrical power distribution lines that have an alignment indicator which provides the user continuous visualization of the direction of the utility power line tool at its farthest most end when manipulating the pole at its nearest most end. Embodiments of the present invention also advantageously provide a telescoping portable utility power line pole for use with the electrical power distribution lines that provides alignment indicators on each pole section of the telescoping portable utility power line pole that align with each other to further enhance the ease of alignment of the respective telescoping pole sections during both extension and retraction. Embodiments of the present invention further advantageously provide a portable utility power line pole and associated methods which can easily be assembled and used on electrical power distribution lines. Note, the term electrical power distribution lines includes but is not limited to only electric lines themselves. It also includes all associated equipment such as transformers, power poles, connectors and fittings for the lines.

More particularly, an embodiment of the present invention provides a portable utility power line pole which includes a main utility power line pole body adapted to be held in the hand of a user, a utility power line tool connector to connect a utility power line tool to the main utility power line pole body, and an alignment indicator to aid the user in visualizing your indication of the utility power line tool. The main utility power line pole body of the portable utility power line has a proximal main body end, a distal main body end, and an outer main body surface. Connected to the distal main body end of the main utility power line pole body can be the utility power line tool connector. The connector is adapted to mount a utility power line tool for use in association with electrical power distribution lines. The connector can be of the type known by those skilled in the art. The alignment indicator is positioned on the outer main body surface in alignment with the utility power line tool connector to provide the user continuous visualization of a user selected orientation of the utility power line tool when mounted on the utility power line tool connector and when the user manipulates the portable utility power line pole at the proximal main body end of the main utility power line pole body. This visualization aids the user to select the orientation of the utility power line tool while working on the electrical power distribution line. In the preferred embodiment of the present invention, the alignment indicator takes the form of a visible line that extends substantially the lengthwise extent of a visible portion of the main utility power line pole body to aid in maximizing visualization of the orientation of the utility power line tool.

The portable utility power line pole described above can include several major embodiments, the two most important of which are explicitly identified and described below. In the first of these embodiments, a utility power line pole body of a portable utility power line pole includes a plurality of collapsible and telescoping tubular shaped pole segments adapted to be positioned between an extended position and a retracted position. Each of the plurality of pole segments have a proximal pole segment end, a distal pole segment end, an outer pole segment surface, and an inner pole segment surface. A first pole segment of the plurality of pole segments can be connected to the utility power line tool connector. The utility power line tool connector can include a utility power line tool connector fitting which engages a distal first pole segment end bore or aperture positioned in the distal first pole segment end. The distal first pole end and utility power line tool connector fitting are preferably threaded such that the utility power line tool connector fitting can be threadingly engaged within the distal first pole segment end bore to provide for a stable attachment or mounting of the utility power line tool. Alternatively, the utility power line tool connector can be welded to the distal first pole segment end or connected by other methodology known by those skilled in the art.

A second pole segment of the plurality of pole segments includes an inner pole segment surface positioned to receive at least portions of the first pole segment therein so that portions of the inner pole segment surface of the second pole segment substantially surround portions of the outer pole segment surface of the first pole segment when the first pole segment is collapsed in the retracted position. The proximal and distal pole segment ends of each of the plurality of pole segments can be connected by various means known by those skilled in the art to allow for telescopic positioning and a locking of the plurality of pole segments. In the preferred configuration, the exterior of a pair of telescoping pole segments, the second pole segment in this description, includes an opening positioned adjacent the distal second pole segment end thereof. The interior of a pair of telescoping pole segments, the first pole segment in this description, includes a collapsible lock member positioned adjacent the proximal pole segment end of the first pole segment end and is adapted to extend through the opening in the distal pole segment end of the second pole segment when in a non-collapsed and biased outward lock position and when the portable utility power line pole is in the extended position. The first pole segment is further adapted to collapse inward in response to an inward pressure from an inner pole segment surface of the second pole segment when in an unlocked position within the second pole segment and not visible to the user and when the portable utility power line pole is in the retracted position.

In this embodiment of the present invention, the above described alignment indicator, in the form of a visible line positioned on the outer main body surface of the main utility power line pole body, is a first alignment indicator positioned on the outer pole segment surface of the second pole segment, and the first pole segment further includes a second alignment indicator to indicate radial position of the collapsible lock member. The first and second alignment indicators are positioned such that a combination of first and second alignment indicators visibly indicate to the user a relative position of the collapsible lock member with respect to the opening positioned adjacent the distal pole segment end of the second pole segment when the at least portions of the first pole segment are positioned within the second pole segment and not visible to the user.

This combination of alignment indicators assists the user in maintaining continuous alignment of the collapsible lock member with the opening in the distal second pole segment end during extension of the first pole segment from within the second pole segment to lock the first pole segment with the second pole segment when in the extended position and assists the user in maintaining continuous alignment of the collapsible lock member with a third opening in the proximal second pole segment end during retraction of the first pole segment into the second pole segment to lock the first pole segment with the second pole segment when in the retracted position. The combination of the first and second alignment indicators also can provide the user visualization of the direction of the utility power line tool or connector when the plurality of collapsible and telescoping tubular shaped pole segments are in the extended position as well as the retracted position.

In the second of these embodiments of the present invention, provided is a portable utility power line pole including a utility power line pole body adapted to be held in the hand of a user and having a proximal pole body end, a distal pole body end, and an outer pole body surface. The portable utility power line pole includes either a single unitary section or a plurality of fixedly mounted unitary sections forming the utility power line pole body rather than the plurality of collapsible and telescoping tubular shaped pole segments, described above. The portable utility power line pole also includes a utility power line tool connector housing connected to the distal pole body end and positioned to house the utility power line tool connector. The utility power line tool connector housing has a proximal tool connector housing end, a distal tool connector housing end, an outer tool connector housing surface, an inner tool connector housing surface, and a tool connector housing chamber positioned between the proximal and distal tool connector housing ends and the inner tool connector housing surface. The utility power line tool connector housing is positioned to receive at least a portion of the utility power line pole body therein so that portions of the inner connector housing surface adjacent the proximal tool connector housing end substantially surround portions of the distal pole body end of the utility power line pole body.

The utility power line tool connector also includes a retractable and extendable hook member which can function as either at least a portion of the utility power line tool connector or the utility power line tool, itself. The retractable and extendable hook member is adapted to be positioned between an open hook position and a closed hook position such that the hook member is substantially positioned within the tool connector housing chamber when in a retracted and closed hook position and extends outwardly from the tool connector housing chamber when in an extended and open hook position. A hook controller is connected between the proximal pole body end of the utility power line pole body and the retractable and extendable hook member and is responsive to the user of the portable utility power line pole to retract and to extend the hook member in a plane parallel with a plane passing between the alignment indicator and center of the utility power line pole body. The retraction and extension is provided to thereby respectively grip and release electrical power distribution line equipment such as a "hot line" clamp when the hook member is functioning as a utility power line tool, and to mount and release a utility power line tool when the hook member is functioning as at least a portion of a utility power line tool connector.

The alignment indicator, positioned on the outer pole body surface, can align with a user selected direction of the hook member to provide the user continuous visualization of an orientation of the hook member when manipulating the portable utility power line pole at the proximal pole body end. The alignment indicator can be in the form of a visible line that extends substantially the lengthwise extent of at least the visible extents of the outer pole body surface, and is positioned such that the hook member extends and retracts longitudinally parallel with a plane passing between the alignment indicator and a center of the utility power line pole body. The hook member can also be connected such that it extends outwardly away from the alignment indicator when in an extended and open hook position. This configuration allows the user to manipulate the position of the hook member prior to extending the hook member into the open position using the hook controller to prevent inadvertent unwanted contact of the hook member with other electrical power distribution line equipment.

Embodiments of the present invention also include methods of assembling and using a portable utility power line pole adapted to be held in the hand of a user for use in association with electrical power distribution lines. For example, according to an embodiment of the present invention, a method of assembling a portable utility power line pole includes providing a power line pole body having a plurality of collapsible and telescoping tubular shaped pole segments. A first pole segment of the plurality of collapsible and telescoping pole shaped segments is prepositioned within a second pole segment having an inner second pole segment surface positioned such that a proximal first pole end of the first pole segment is collapsed in a retracted position into a distal second pole end of the second pole segment. The first and second pole segments have respective first and second alignment indicators positioned on an outer pole segment surface of each of the first and second pole segments which form a pair of adjacent alignment indicators. At least one but preferably both of the first and second alignment indicators extend substantially the lengthwise extent of at least the respective first and second outer pole segment surfaces.

The first and second pole segments are readied for use by extending the first pole segment from the retracted position within the second pole segment and connecting a collapsible lock member positioned adjacent the proximal first pole end of the first pole segment through a distal second pole end opening positioned in the distal second pole end. The collapsible lock member is positioned in alignment with the alignment indicator of the first outer pole segment surface. Correspondingly, the second pole segment is in alignment with the second alignment indicator of the second outer pole segment surface. The alignment with and connection of the collapsible lock member and the distal second pole end opening is efficiently accomplished by extending the first pole segment from the retracted position within the second pole segment while viewing the pair of alignment indicators to maintain alignment of the collapsible lock member with the opening in the distal second pole end of the second pole segment during such extension.

According to an embodiment of the present invention, a method of using the portable utility power line pole includes providing an assembled portable utility power line pole adapted to be held in the hand of a user. The portable utility power line pole includes a pole body having a distal pole body end and a power line tool connector connected thereon and adapted to mount a power line tool for use in association with electrical power distribution lines. An alignment indicator is positioned on an outer pole body surface of the pole body in alignment with the power line tool connector to provide the user visualization of a user selected orientation of the power line tool when mounted on the power line tool connector and when the user manipulates the portable utility power line pole at a proximal pole body end of the pole body to select the orientation of the power line tool. This can be best accomplished through use of an alignment indicator in the form of a visible line that extends substantially the lengthwise extent of at least the visible extents of the outer pole body surface.

Method also includes mounting the power line tool to the power line tool connector in alignment with the alignment indicator to provide the user visualization of the direction of the power line tool when manipulating the portable utility power line pole. The user manipulates the portable utility power line pole while viewing the alignment indicator at the proximal pole body end of the pole body to maintain continuous visualization of the direction of the utility power line tool at the distal pole body end of the pole body of the portable utility power line pole. This prevents the user from inadvertently and unwarrantedly contacting other electrical power distribution line equipment with the utility power line tool.

Advantageously, the portable utility power line pole alignment indicator provides the user visualization of the orientation of a power line tool positioned on the farthest most end of the pole when manipulating the pole at its nearest most end even when faced with bad weather or low-light conditions. Advantageously, the portable utility power line pole alignment indicator in the telescoping portable utility power line pole embodiment is easily viewable by the user to allow the user to visualize the location of means for connecting a pair of poles such as a collapsible lock member of the inner pole section and opening in the outer pole section, negating the requirement for the user to have to radially twist the two pole sections relative to each other to "feel" for the member in order to align the member with the hole of the adjacent outer pole section until engagement occurs. Advantageously, the user is provided visualization so as to easily position multiple pole sections in a retracted position where a single member engages each of the holes of corresponding adjacent outer pole sections.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2 is a fragmentary perspective view of a portable utility power line pole having a power line pole body comprising a plurality of collapsible and telescoping tubular shaped pole segments in an extended position, according to another embodiment of the present invention;

FIG. 3 is a perspective view of a portable utility power line pole of FIG. 1 in a retracted position, according to an embodiment of the present invention;

FIG. 4 is a perspective view of a portable utility power line pole, according to another embodiment of the present invention;

DETAILED DESCRIPTION

Embodiments of the present invention will now be described more fully hereinafter with reference to the accompanying drawings, which illustrate embodiments of the invention. This invention may, however, be embodied in many other different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
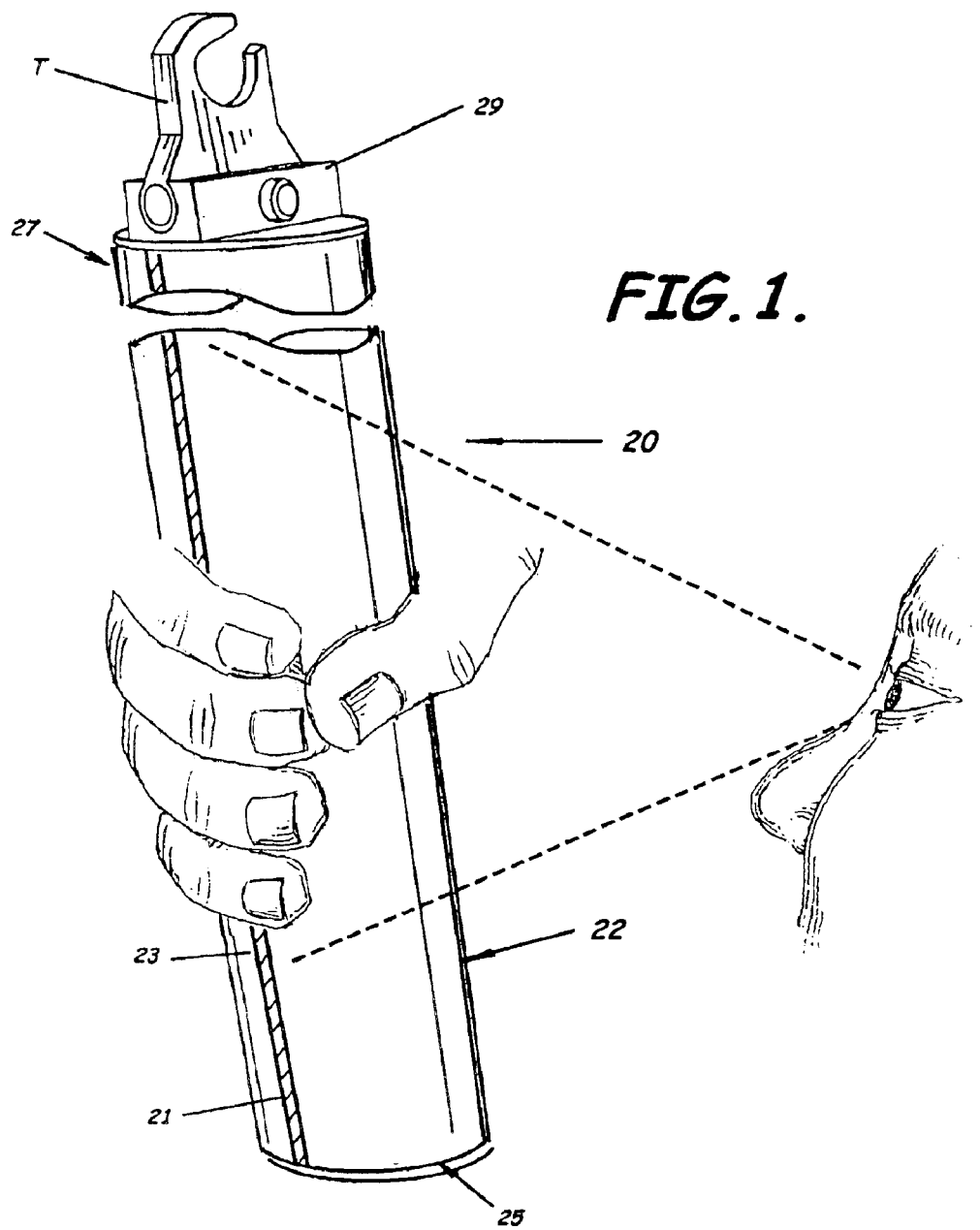
FIG. 1 is a fragmentary perspective view of a utility power line pole, according to an embodiment of the present invention.

As illustrated in FIG. 1, embodiments of the present invention advantageously provide a portable utility power line pole 20 adapted to be held in the hand of a user for use in association with electrical power distribution lines and having an alignment indicator 21 to provide the user continuous visualization of a user selected orientation of a utility power line tool T when mounted on a utility power line tool connector 29 and when the user manipulates the portable utility power line pole 20 at a proximal end of a utility power line pole body 22. Note, the term electrical power distribution lines includes but is not limited to not only electric lines themselves but also all associated equipment such as transformers, power poles, power lines, connectors and fittings for the lines.

Generically, transcending the various embodiments of the present invention, as perhaps best shown in FIG. 1, provided is a portable utility power line pole 20 which includes a main utility power line pole body 22 adapted to be held in the hand of a user, a utility power line tool connector 29 adapted to connect a utility power line tool T to the main utility power line pole body 22, and an alignment indicator 21 to aid the user in visualizing a spatial orientation or direction of the utility power line tool connector 29 and thus the utility power line tool T. The main utility power line pole body 22 of the portable utility power line pole 20 has a proximal main body end 25, a distal main body end 27, and an outer main body surface 23. Connected to the distal main body end 27 of the main utility power line pole body 22 can be the utility power line tool connector 29. The connector 29 is adapted to mount a utility power line tool T for use in association with electrical power distribution lines. The connector 29 can be of a type known by those skilled in the art. The alignment indicator 21 is positioned on the outer main body surface 23 in alignment with the utility power line tool connector 29 to provide the user visualization of a user selected orientation of the utility power line tool T when mounted on the utility power line tool connector 29 and when the user manipulates the portable utility power line pole 20 at the proximal main body end 25 of the main utility power line pole body 22. This visualization aids the user to select the orientation of the utility power line tool T while working on the electrical power distribution line. The alignment indicator 21 preferably takes the form of a visible line that extends substantially the lengthwise extent of a visible portion of the main utility power line pole body 22 to aid in maximizing visualization of the orientation of the utility power line tool T. Though the alignment indicator 21 can span less than the extent of the visible portion of the main utility power line pole body 22, use of a substantially continuously spanning line positioned along the main utility power line pole body 22 has been found to be the preferred methodology.

The portable utility power line pole described above can include multiple major embodiments of the present invention, the two most important of which are explicity identified and described in detail below. As shown in FIGS. 2–3, in the first of these embodiments, a portable utility power line pole 40 is configured to be extendable and retractable using telescopic features. As shown in FIG. 4, in the second of these embodiments, a portable utility power line pole 80 is configured to have a utility power line pole body which includes either a single unitary section or a plurality of fixedly mounted unitary sections forming a stronger and structurally more stable utility power line pole body than the plurality of collapsible and telescoping tubular shaped pole segments.

Figure 5:
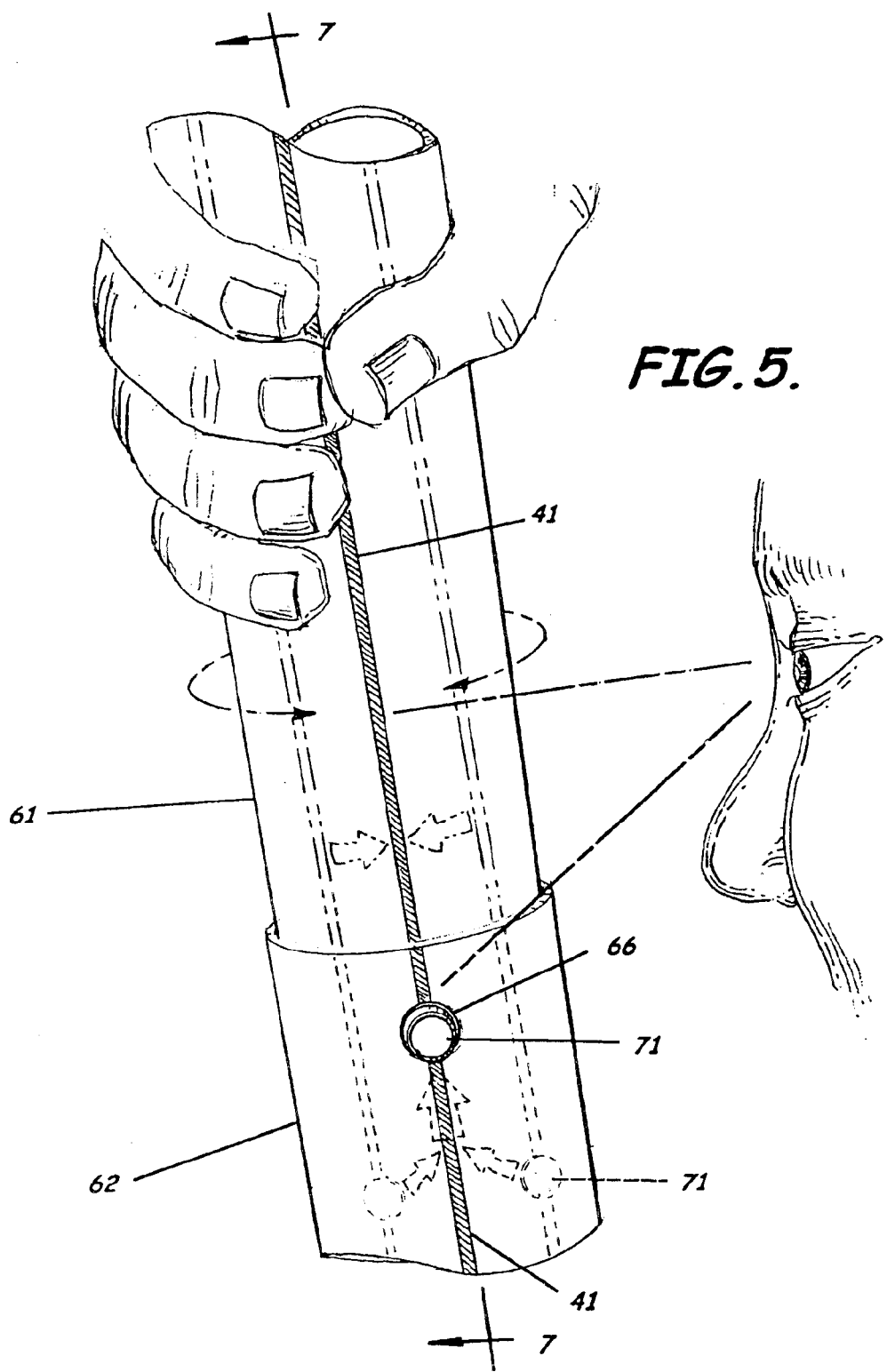
FIG. 5 is an enlarged fragmentary environmental view of a utility power line pole of FIG. 2, according to an embodiment of the present invention.
Figure 7:
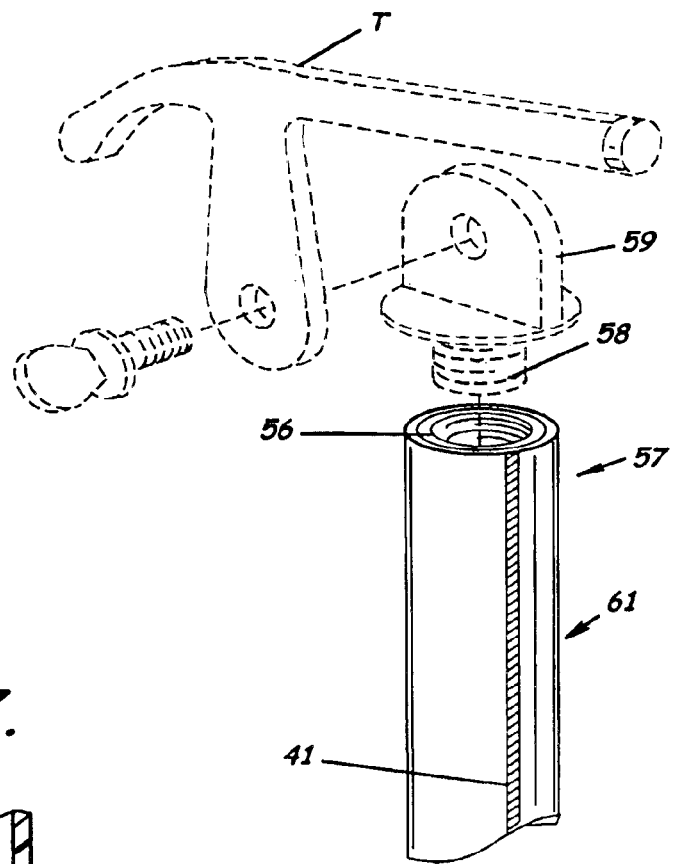
FIG. 7 is a sectional view of two adjacent utility power line pole segments of a utility power line pole taken along line 7—7 of FIG. 5, according to embodiment of the present invention.

As shown in FIGS. 2–5, 7, and 8, the telescoping portable utility power line pole 40 includes a power line pole body 42 adapted to be positioned between an extended position (FIG. 2) and a retracted position (FIG. 3) and adapted to be held in the hand of a user. More specifically, the power line pole body 42 includes a plurality of collapsible and telescoping tubular shaped pole segments adapted to be positioned between an extended position and a retracted position. Note, although FIG. 2 depicts three pole segments 61–63, more pole segments or less pole segments can be included in the plurality of pole segments. Each of the plurality of pole segments 61–63 have a proximal pole segment end 55, a distal pole segment end 57, an outer pole segment surface 53, and an inner pole segment surface 54. Correspondingly, only pole segments 61 and 62 are shown in FIGS. 5 and 7.

Figure 8:
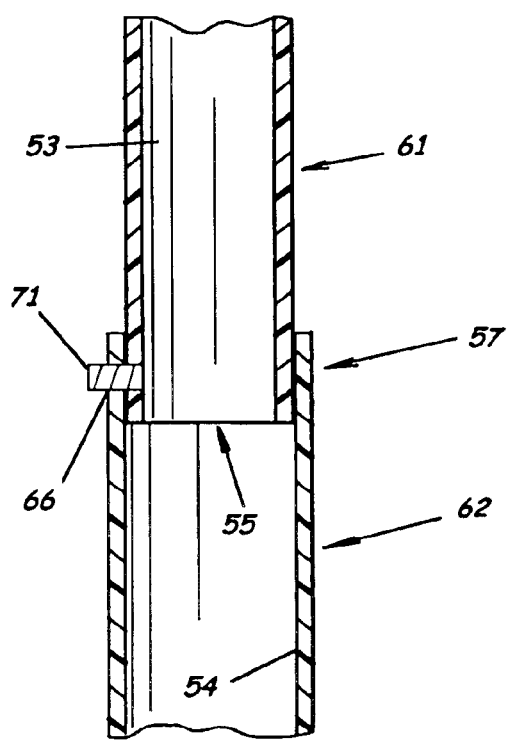
FIG. 8 is a perspective view of a distal end of a utility power line pole segment of FIG. 2, according to embodiment of the present invention.

As perhaps best shown in FIG. 8, a first pole segment 61 of the plurality of pole segments 61–63 can be connected to the utility power line tool connector 59. The utility power line tool connector 59 can include a utility power line tool connector fitting 58 which engages a distal pole segment end bore or aperture 56 positioned in the distal pole segment end 57 of the first pole segment 61. The distal pole end 57 of the first pole segment 61 and the utility power line tool connector fitting 58 are preferably threaded such that the utility power line tool connector fitting 58 can be threadingly engaged within the bore or aperture 56 in the distal pole segment end 57 of the first pole segment 61 to provide for a stable attachment or mounting of the utility power line tool T. The utility power line tool connector 59 can alternatively be welded to the distal pole segment end 57 or connected by other methodology known by those skilled in the art and still remain within the scope of the present invention.

As perhaps best shown in FIG. 7, a second pole segment 62 of the plurality of pole segments includes an inner pole segment surface 54 positioned to receive at least portions of the first pole segment 61 therein so that portions of the inner pole segment surface 54 of the second pole segment 62 substantially surround portions of the outer pole segment surface 53 of the first pole segment 61 when the first pole segment 61 is collapsed in the retracted position (FIG. 3). Adjacent proximal and distal pole segment ends 55, 57, of each of the plurality of pole segments 61–63 can be connected by various locking means known by those skilled in the art to allow for telescopic positioning and locking of the plurality of pole segments 61–63. As shown in FIG. 7, in the preferred configuration, the exterior pole segment of a pair of telescoping pole segments, the second pole segment 62 in this illustration, includes an opening 66 positioned adjacent the distal pole segment end 57 thereof, and the interior of a pair of telescoping pole segments, the first pole segment 61 in this illustration, includes a collapsible lock member 71 positioned adjacent the proximal pole segment end 55 of the first pole segment 61 adapted to extend through the opening 66 in the distal pole segment end 57 of the second pole segment 62 when in a non-collapsed and biased outward lock position and when the portable utility power line pole 20 is in the extended position.

As stated above, other embodiments or configurations of the locking means can be used as well according to the present invention. Although the positioning of the collapsible lock member 71 associated with an interior pole segment through an opening 66 in an exterior pole segment provides some distinct advantages with respect to ease of use and ease of manufacture, this feature is not of necessity in order to still comply with the scope and spirit of the invention. For example, instead of an opening 66 in the form of a relatively small aperture in the distal segment end 57 of the exterior pole segment, a circumferentially extending slot (not shown) can be provided. Instead of a collapsible lock member 71 adjacent the proximal segment end 55 of the interior pole segment, a pin (not shown) can be used to interface with the slot. Also for example, instead of the opening 66 in the distal segment end 57 of the exterior pole segment, a recess (not shown) outwardly extending from the inner pole segment surface 54 of the exterior pole segment can accommodate the collapsible lock member 71 along with means such as a ramp (not shown) interfaced with the recess to allow for engagement and disengagement of the recess with the collapsible lock member 71. Also for example, instead of a collapsible lock member 71, the proximal segment end 55 of the interior pole segment and distal segment end 57 of the exterior pole segment can instead include an unobstructed opening (not shown) to allow passage of a fitting or fastener (not shown). Once the opening in the distal segment end 57 of the outer adjacent segment is aligned with the opening in the proximal segment end 55 of the inner adjacent segment, the fitting or fastener can be positioned through the openings. The openings can be threaded or not threaded. If not threaded, there should be a second set of openings (not shown) on each of the adjacent pole segments on opposite sides to allow simultaneous passage of the fitting or fastener through both sets of openings in the adjacent segments, or a means for retaining the fitting or fastener in the openings.

As shown in FIGS. 2–3 and 7, the first pole segment 61, as with each of the plurality of pole segments positioned interior to at least one of the other of the plurality of pole segments, can be further adapted to collapse inward responsive to an inward pressure from an inner pole segment surface 54 of the second pole segment 62 when in an unlocked position within the second pole segment and not visible to the user. This occurs when the portable utility power line pole 40 or at least a pair of adjacent pole segments is in the retracted or semi-retracted position. In order for the plurality of pole segments 61–63 of the portable utility power line pole 40 to maintain this retracted position, the first pole segment 61 can include a second collapsible lock member 72 (FIG. 3) positioned adjacent the distal pole segment end 57 of the first pole segment 61. The second collapsible lock 72 of the first pole segment 61 is adapted to extend through each of the openings 66 in the distal pole segment ends 57 of the other pole segments 62–63 when positioned exterior to the first pole segment 61 when in a collapsed position and surrounding the first pole segment 61.

As shown in FIGS. 2–3, and 5, the portable utility power line pole 40 also includes an alignment indicator 41 positioned on the outer pole segment surface 43 of the first pole segment 61 to visibly indicate to the user a radial position of the collapsible lock member 71 when the at least portions of the first pole segment 61 are positioned within the second pole segment 62 and not readily visible to the user. As perhaps best shown in FIG. 5, the alignment indicator 41 assists the user in maintaining continuous alignment of the collapsible lock member 71 with the opening 66 in the second pole segment 62 during extension of the first pole segment 61 from within the second pole segment 62 to lock the first pole segment 61 with the second pole segment 62 when in the extended position. The outer pole segment surface 43 of the second pole segment 62 can also have the alignment indicator 41 which allows the alignment indicator 41 on the outer pole segment surface 43 on the second pole segment 62 to more readily be aligned with the opening 66 in the second pole segment 62 during extension, and can serve to visibly indicate to the user a radial position of a collapsible lock member 71 in the second pole segment 62 when the at least portions of the second pole segment 62 are positioned within a third pole segment 63 and not readily visible to the user.

This combination of alignment indicators 41 assists the user in maintaining continuous alignment of the collapsible lock member 71 in the proximal pole segment end 55 of the first pole segment 61 with the opening 66 in the distal pole segment end 57 of the second pole segment 62 during extension of the first pole segment 61 from within the second pole segment 62 to lock the first pole segment 61 with the second pole segment 62 when in the extended position and assists the user in maintaining continuous alignment of the collapsible lock member 71 in the first pole segment 61 with an opening 66 in the distal pole segment ends of the second and third pole segments 62, 63, during retraction of the first pole segment 61 into the second and third pole segments 62, 63, to lock the first pole segment 61 with the second and third pole segments 62, 63, when in the retracted position.

As shown in FIGS. 2, 3, and 8, advantageously, the combination of the first and second alignment indicators 41 align with each other to define a visible line that extends substantially the lengthwise extent of the portable utility power line pole 40 to also further provide the user visualization of the direction or orientation of the utility power line tool connector 59 and thus the utility power line tool T when the user manipulates the portable utility power line pole 40 adjacent the proximal body end 45 of the power line pole body 42 with the plurality of collapsible and telescoping tubular shaped pole segments 61–63 either in the extended position or the retracted position. The power line tool connector 59 can be positioned such that the utility power line tool T is vertically aligned with the visible line when positioned thereon to further provide user continuous orientation of the tool T.

As shown in FIGS. 2–3, in the preferred configuration, the outer segment surface 53 of each of the plurality of collapsible and telescoping tubular shaped pole segments 61–63 include an alignment indicator 41 on their respective outer pole segment surfaces 53 for the purposes described above. For example, as illustrated in FIGS. 2 and 3, the portable utility power line pole 40 can further include a third pole segment 63 also having a proximal third pole end 55, a distal third pole end 57, an outer third pole segment surface 53, and an inner third pole segment surface 54 positioned such that the third pole segment receives at least portions of the second pole segment 62 within the tubular portions of the third pole segment 63. The third pole segment 63 can also have an opening 66 positioned adjacent the distal pole end 57 of the third pole segment 63 which is positioned to receive a collapsible lock member 71 positioned adjacent the proximal pole segment end 55 of the second pole segment 62 when in the extended position.

As perhaps best shown in FIG. 2, the alignment indicator 41 on the outer pole segment surface 53 of the second pole segment 62 is correspondingly positioned to preferably continuously visibly indicate to the user a radial position of the collapsible lock member 71 when the at least portions of the second pole segment 62 are positioned within the third pole segment 63 and not visible to the user. This configuration is provided to thereby assist the user in maintaining continuous alignment of the collapsible lock member 71 in the second pole segment 62 with the opening 66 in the third pole segment 63 during extension of the second pole segment 62 from within the third pole segment 63 to lock the second pole segment 62 with the third pole segment 63 when in the extended position. The outer pole segment surface 53 of the third pole segment 63 can also include an alignment indicator 41 positioned thereon. Similar to the function of the combination of the alignment indicators 41 on the first and second pole segments 61, 62, the combination of the alignment indicators 41 on the second and third pole segments 62, 63, also further align with each other to further enhance ease of alignment to readily align the collapsible lock member 71 of the second pole segment 62 with the opening 66 on the third pole segment 63 during extension of the second pole segment 62 from within the third pole segment 63. Correspondingly, alignment indicators 41 on the first, second, and third pole segments 61–63 can align with each other to further define the visible line that extends substantially the lengthwise extent of the utility power line pole 40 to further enhance the ease of alignment to provide the user continuous visualization of the direction of the utility power line connector 59 and thus the utility power line tool T when manipulating the portable utility power line pole 40 adjacent the proximal body end 45 of the power line pole body 42.

Figure 6:
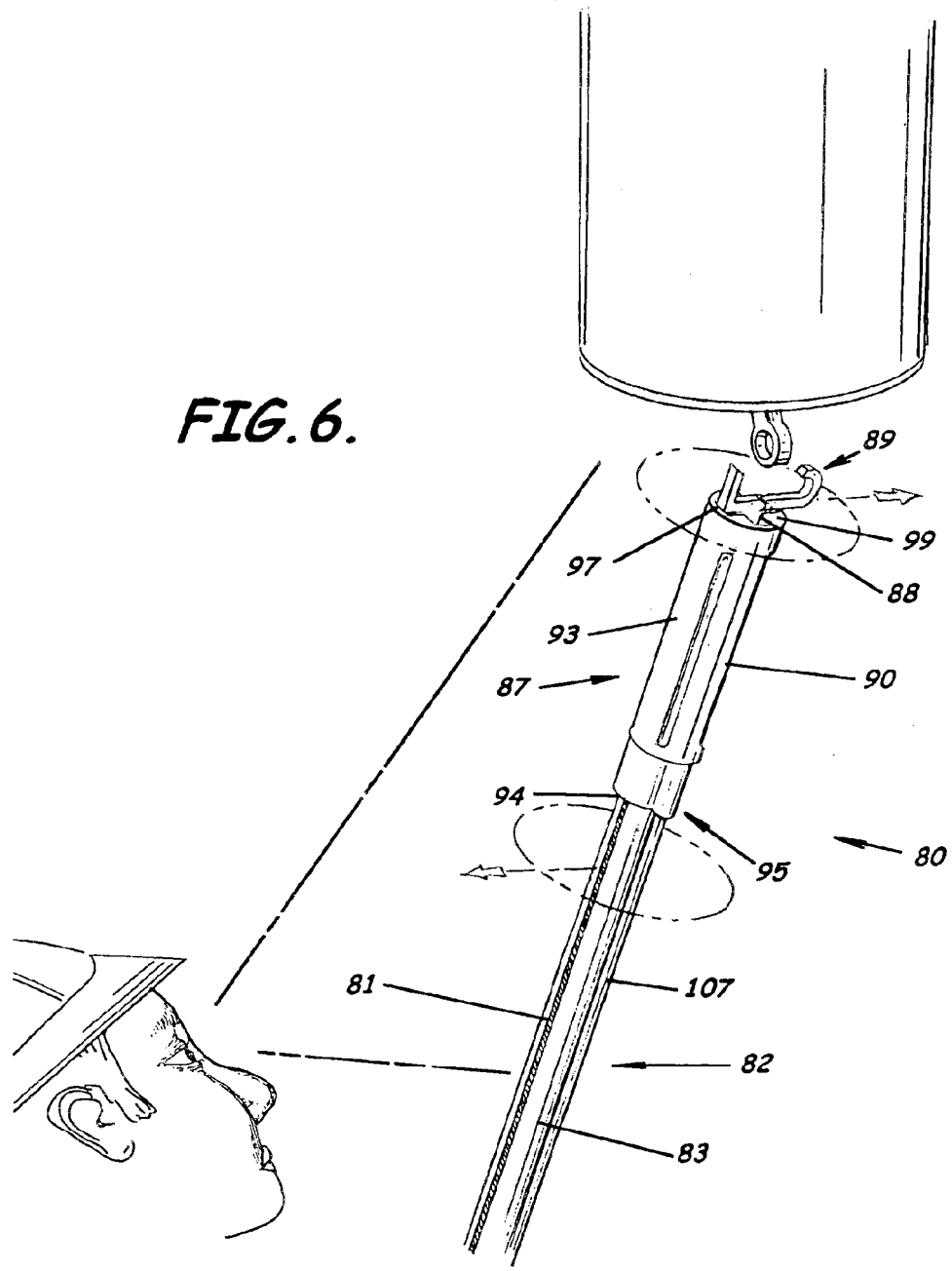
FIG. 6 is a fragmentary environmental view of a utility power line pole of FIG. 4, according to an embodiment of the present invention.

As stated previously, in some electrical power line distribution maintenance procedures, such as when installing "hot line" clamps, a utility power line pole having a telescoping pole body is not typically used in favor of use of a heavier gauge pole body design having an insulated head section and often referred to as a clamps stick or a shotgun stick. As shown in FIGS. 4 and 6, this section of the major embodiment of the present invention, as with the prior described embodiments of the present invention, provides a portable utility power line pole 80 including a pole body 82 adapted to be held in the hands of a user and having a proximal pole body end 85, a distal pole body end 87, and an outer pole body surface 83 having an alignment indicator 81, thereon. The portable utility power line pole 80 also further includes a utility power line tool connector housing 90 connected to the distal main body end 87 and positioned to house the utility power line tool connector 89. The utility power line tool connector housing 90 has a proximal tool connector housing end 95, a distal tool connector housing end 97, an outer tool connector housing surface 93, an inner tool connector housing surface 94, and a tool connector housing chamber 99 positioned between the proximal and distal tool connector housing ends 95, 97, and the inner tool connector housing surface 94. The utility power line tool connector housing 90 is positioned to receive at least a portion of the utility power line pole body 82 therein so that portions of the inner tool connector housing surface 94 adjacent the proximal tool connector housing end 95 substantially surrounds portions of the distal pole body end 87 of the utility power line pole body 82.

The utility power line tool connector 89 also includes a retractable and extendable hook member 88 including a collapsible hook which can function as either at least a portion of the utility power line tool connector or the utility power line tool, itself. The retractable and extendable hook member 88 is adapted to be positioned between an open hook position and a closed hook position such that the hook member 88 is substantially positioned within the tool connector housing chamber 90 when in a retracted and closed hook position and extends outwardly from the tool connector housing chamber 90 as shown in FIG. 6 when in an extended and open hook position. A hook controller 101 (FIG. 4) is connected between the proximal pole body end 85 of the utility power line pole body 82 and the retractable and extendable hook member 88 and is responsive to the user of the portable utility power line pole 80 to retract and to extend the hook member 88 in a plane parallel with a plane passing between the alignment indicator 81 and center of the utility power line pole body 82. The retraction and extension of the hook member 88 is provided to thereby respectively grip and release electrical power distribution line equipment such as a "hot line" clamp when the hook member is functioning as a utility power line tool, and to mount and release a utility power line tool when the hook member is functioning as at least a portion of a utility power line tool connector. Various types of hook member controllers are well known to those skilled in the art, either of which is within the scope of the present invention, however, the type illustrated in the figures is the most common. Hook controller 101 illustrated, includes a retractable handle assembly 103 having a releasable lock lever 105 to lock the handle assembly 103 in a hook retracted position and release the handle assembly 103 to allow forward longitudinal movement into a hook extended position. The handle assembly 103 also includes a depressible spring-loaded release button (not shown) to allow further forward longitudinal movement of the handle assembly 103 in order to open the hook member 88. The hook controller 101 also includes a control rod 107 positioned between the handle assembly 103 and the hook member 88 to translate user input to the handle assembly 103 into the hook member 88 to allow for the extending and the retracting of the hook member 88 and the opening (FIG. 6) and the collapsing (FIG. 4) of the associated hook.

The alignment indicator 81, positioned on the outer pole body surface 83, can align with a user selected direction of the hook member 88 to provide the user continuous visualization of an orientation of the hook member 88 when manipulating the portable utility power line pole 80 at the proximal pole body end 85. In the preferred configuration, the alignment indicator 81 is in the form of a visible line that preferably extends substantially the lengthwise extent of at least the visible extents of the outer pole body surface 82 and is positioned such that the hook member 88 extends and retracts longitudinally parallel with a plane passing between the alignment indicator 81 and a center of the utility power line pole body 82. The hook member 88 can also be connected such that the hook extends outwardly away from the alignment indicator 81 as perhaps best shown in FIG. 8, when in an extended and open hook position. This configuration of the alignment indicator 81 allows the user to manipulate the position of the hook member prior to extending the hook member 88 into the open position using the hook controller 101 to prevent inadvertent unwanted contact of the hook member 88 with other electrical power distribution line equipment.

As shown in FIG. 4, the portable utility power line pole 80 can further include a second utility power line tool connector 99 adapted to mount a second utility power line tool (not shown) for use in association with electrical power distribution lines. The second utility power line tool connector 99 can be connected to the proximal pole body end 85 of the pole body 82. The second utility power line tool connector 99 is preferably of the type similar to that typically used with the telescoping utility power line pole 40. This additional utility power line tool connector 99 provides the user the ability to mount and manipulate a utility power line tool not amiable to being mounted on or grasped by the hook member 88. The second utility power line tool connector 99 is preferably positioned such that the alignment indicator 81 also aligns with the user selected direction of the second utility power line tool connector 99 and thus the second utility power line tool to provide the user visualization of the orientation of the second utility power line tool when mounted to the second utility power line tool connector 99 and when the user is instead manipulating the portable utility power line pole 80 at the distal pole body end 87.

As shown in FIGS. 1–3, 5, and 7–8, the present invention also includes methods of assembling and using a portable utility power line pole adapted to be held in the hand of a user for use in association with electrical power distribution lines. For example, an embodiment of the present invention provides a method of assembling a telescoping portable utility power line pole such as portable utility power line pole 40. The method includes providing a power line pole body 42 including, for example, a plurality of collapsible and telescoping tubular shaped pole segments 61–63. As shown in FIGS. 3 and 7, a first pole segment 61 of the plurality of collapsible and telescoping pole shaped segments is prepositioned within a second pole segment 62 having an inner second pole segment surface 54 and positioned such that a proximal pole end 55 of the first pole segment 61 is collapsed in a retracted position into and through a distal second pole end 57 of the second pole segment 62. The first and second pole segments 61, 62, each have respective alignment indicators 41 positioned on an outer pole segment surface 53 of each of the first and second pole segments 61, 62 which form a pair of adjacent alignment indicators 41. At least one but preferably both of the alignment indicators 41 on the first and second pole segments 61, 62, preferably extend substantially the lengthwise extent of at least the respective first or second outer pole segment surfaces 53.

The first and second pole segments 61, 62, are readied for use by extending the first pole segment 61 from the retracted position within the second pole segment 62 (FIG. 3) and either prior to or after extension, connecting the means for connecting adjacent pole segments such as connecting a collapsible lock member 71, positioned adjacent the proximal pole end 55 of the first pole segment 61, through a distal pole end opening 66 positioned in the distal pole end 57 of the second pole segment 62. The collapsible lock member 71 is positioned in alignment with the alignment indicator 41 of the outer pole segment surface 53 of the first pole segment 61. Correspondingly, the opening 66 in the second pole segment 62 is in alignment with the alignment indicator 41 on the outer pole segment surface 53 of the second pole segment 62. As perhaps best shown in FIG. 5, the alignment with and connection of the collapsible lock member 71 in the proximal pole end 55 of the first pole segment 61 and the opening 66 in the distal pole end 57 of the second pole segment 62 is efficiently accomplished by extending the first pole segment 61 from the retracted position within the second pole segment 62 while viewing the adjacent pair of alignment indicators 41 to maintain alignment of the collapsible lock member 71 with the opening 66 during such extension until the collapsible lock member 71 extends through opening 66 (FIG. 7). The second pole segment 62 is extended from within the third pole segment 63 in the same manner and is typically extended prior to the extension of the first pole segment 61 from the second pole segment. Additionally, in an embodiment of the present invention, the first pole segment 61 includes a second collapsible lock member 72 (FIG. 3) positioned to engage with opening 66 in the second and third pole segments 62, 63, when fully retracted and positioned therein. If so configured, prior to extending the second pole segment 62 from the third pole segment 63 or the first pole segment 61 from the second pole segment 62, the collapsible lock member 72 must be depressed through opening 66 in the respective exterior pole member 62 or 63.

As perhaps best shown in FIG. 1, according to an embodiment of the present invention, a method of using the portable utility power line pole includes providing, for example, an assembled portable utility power line pole 20 adapted to be held in the hand of a user. The portable utility power line pole 20 includes a pole body 22 having a distal pole body end 27 and a power line tool connector 29 adapt to connect thereon, the connector 29 adapted to mount a power line tool T for use in association with electrical power distribution lines. An alignment indicator 21 is positioned on an outer pole body surface 23 of the pole body 22 in alignment with the power line tool connector 29 to provide the user preferably continuous visualization of a user selected orientation of the power line tool T when mounted on the power line tool connector 29 and when the user manipulates the portable utility power line pole 20 at a proximal pole body end 25 of the pole body 22 to select the orientation of the power line tool T. This can be best accomplished through use of an alignment indicator 21 in the form of a visible line that preferably extends substantially the lengthwise extent of at least the visible extents of the outer pole body surface 23.

The method also includes mounting the power line tool connector 29, if not already mounted, and mounting the power line tool T to the power line tool connector 29 in alignment with the alignment indicator 21, similar to that as illustrated in FIG. 1, to provide the user visualization of either the direction or orientation of the power line tool T when manipulating the portable utility power line pole 20. The user manipulates the portable utility power line pole 20 while viewing the alignment indicator 21 at or near the proximal pole body end 25 of the pole body 22 to maintain continuous visualization of the direction of the utility power line tool T at the distal pole body end 27 of the pole body 22 of the portable utility power line pole 20. This prevents the user from inadvertently and unwarrantedly contacting other electrical power distribution line equipment with the utility power line tool T. Advantageously, this level of control is available because such positioning of the alignment indicator 21 with respect to the utility power line tool T provides a spatial orientation of the utility power line tool T not otherwise obtainable without the alignment indicator 21. This spatial orientation problem results from the extended distance between the eyes of the user or operator and a utility power line tool T positioned at the distal pole end 27 of a utility power line pole 20. The alignment indicator 21 provides visual cues that help the user maintain such spatial orientation not otherwise obtainable.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the attached claims. For example, the pole body could have only one section or more than three sections. Although described in detail with respect to power line utility poles in the form of telescopic sticks and shotguns sticks, straight sticks are equally within the scope of the present invention. Also for example, the alignment indicator need not align with the radial axis of a utility power line tool connector but rather may line with an alternative reference point with respect to the utility power line tool.

What is claimed is:

1. A portable utility power line pole comprising:
   a main utility power line pole body adapted to be held in the hand of a user and having a proximal main body end, a distal main body end, and an outer main body surface;
   a utility power line tool connector connected to the distal main body end and adapted to mount a utility power line tool for use in association with electrical power distribution lines; and
   an alignment indicator in the form of a visible line positioned on the outer main body surface in alignment with the utility power line tool connector to provide the user continuous visualization of the user selected orientation of the utility power line tool when mounted on the utility power line tool connector and when the user manipulates the portable utility power line pole at the proximal main body end of the main utility power line pole body to select the orientation of the utility power line tool.

2. A portable utility power line pole of claim 1, wherein the alignment indicator extends substantially the lengthwise extent of a visible portion of the main utility power line pole body.

3. A portable utility power line pole of claim 2, further comprising:
   a utility power line tool connector housing connected to the distal main body end, positioned to house the utility power line tool connector, and having a proximal tool connector housing end, a distal tool connector housing end, an outer tool connector housing surface, an inner tool connector housing surface, and a tool connector housing chamber positioned between the proximal and distal tool connector housing ends and the inner tool connector housing surface and positioned to receive at least a portion of the main utility power line pole body therein so that portions of the inner connector housing surface adjacent the proximal tool connector housing end substantially surround portions of the distal main body end of the main utility power line pole body, and wherein the utility power line tool connector includes a retractable and extendable hook member adapted to be positioned between an open hook position and a closed hook position such that the hook member is substantially positioned within the tool connector housing chamber when in a retracted and closed hook position and extends outwardly from the tool connector housing chamber when in an extended and open hook position; and a hook controller connected between the proximal main body end of the main utility power line pole body and the retractable and extendable hook member and responsive to the user of the portable utility power line pole to retract and to extend the hook member along a plane parallel with a plane passing between the alignment indicator and a center of the main utility power line pole body to thereby mount and release the utility power line tool.

4. A portable utility power line pole of claim 1, wherein the main utility power line pole body includes a plurality of collapsible and telescoping tubular shaped pole segments adapted to be positioned between an extended position and a retracted position, each of the plurality of pole segments having a proximal pole segment end, a distal pole segment end, an outer pole segment surface, and an inner pole segment surface, wherein a first pole segment of the plurality of pole segments is connected to the utility power line tool connector, wherein a second pole segment of the plurality of pole segments includes an inner pole segment surface positioned to receive at least portions of the first pole segment therein so that portions of the inner pole segment surface of the second pole segment substantially surround portions of the outer pole segment surface of the first pole segment when the first pole segment is collapsed in the retracted position.

5. A portable utility power line pole of claim 4, wherein the second pole segment includes an opening positioned adjacent the distal pole segment end thereof, wherein the first pole segment of the main utility power line pole body further includes a collapsible lock member positioned adjacent the proximal pole segment end of the first pole segment and adapted to extend through the opening in the distal pole segment end of the second pole segment when in a non-collapsed and biased outward lock position and when the portable utility power line pole is in the extended position and adapted to collapse inward responsive to an inward pressure from an inner pole segment surface of the second pole segment when in an unlocked position within the second pole segment and not visible to the user and when the portable utility power line pole is in the retracted position, wherein the alignment indicator on the outer main body surface is a first alignment indicator positioned on the outer pole segment surface of the second pole segment, wherein the first pole segment includes a second alignment indicator to indicate radial position of the collapsible lock member, and wherein the first and second alignment indicators are positioned such that a combination of first and second alignment indicators visibly indicate to the user a relative position of the collapsible lock member with respect to the opening positioned adjacent the distal pole segment end of the second pole segment when the at least portions of the first pole segment are positioned within the second pole segment and not visible to the user to thereby assist the user in maintaining continuous alignment of the collapsible lock member with the opening in the distal second pole segment end during extension of the first pole segment from within the second pole segment to lock the first pole segment with the second pole segment when in the extended position.

6. A portable utility power line pole of claim 5, wherein the combination of the first and second alignment indicators further provide the user visualization of the orientation of the utility power line tool when the plurality of collapsible and telescoping tubular shaped pole segments are in the extended position as well as the retracted position.

7. A portable utility power line pole comprising:

a power line pole body adapted to be positioned between an extended position and a retracted position, adapted to be held in the hand of a user, and having a proximal body end, a distal body end, and a plurality of collapsible and telescoping tubular shaped pole segments therebetween, the plurality of the collapsible and telescoping tubular shaped pole segments including:

a first pole segment having a proximal first pole segment end, a distal first pole segment end, and an outer first pole segment surface and an inner first pole segment surface extending therebetween, and adapted to mount a utility power line tool connector to the distal first pole end thereon, and a second pole segment having a proximal second pole end, a distal second pole end, a second pole opening positioned adjacent the distal second pole end thereof, an outer second pole segment surface and an inner second pole segment surface extending therebetween, the inner second pole segment surface positioned such that the second pole segment receives at least portions of the first pole segment within the tubular portions of the second pole segment so that portions of the inner second pole segment surface substantially surround portions of the outer first pole segment surface when the first pole segment is collapsed in the retracted position;

a collapsible lock member positioned adjacent the proximal first pole segment end of the first pole segment, adapted to extend through the second pole opening in the distal second pole segment end when in a non-collapsed and biased outward lock position and when the power line pole body is in the extended position, and adapted to collapse inward responsive to inward pressure from an inner second pole segment surface when in an unlocked position within the second pole segment and not visible to the user and when the power line pole body is in the retracted position; and an alignment indicator positioned on the outer first pole segment surface to visibly indicate to the user a radial position of the collapsible lock member when the at least portions of the first pole segment are positioned within the second pole segment and not readily visible to the user to thereby assist the user in maintaining continuous alignment of the collapsible lock member with the second pole opening in the second pole segment during extension of the first pole segment from within the second pole segment to lock the first pole segment with the second pole segment when in the extended position.

8. A portable utility power line pole of claim 7, wherein the alignment indicator on the outer first pole segment surface is a first alignment indicator and the outer second pole segment surface further includes a second alignment indicator positioned thereon, and wherein the first and second alignment indicators align with each other to define a visible line that extends substantially the lengthwise extent of the utility power line pole.

9. A portable utility power line pole of claim 8, further comprising the utility power line tool connector adapted to mount a utility power line tool and connected to the distal first pole end of the first pole segment of the power line pole body, and wherein the visible line extending substantially the lengthwise extent of the utility power line pole aligns with a user selected orientation of the utility power line tool when mounted on the utility power line tool connector to provide the user visualization of the orientation of the utility power line tool when the first and second pole segments are in the extended position and when the user manipulates the portable utility power line pole adjacent the proximal body end of the power line pole body.

10. A portable utility power line pole of claim 9, wherein the collapsible lock member of the first pole segment is a first collapsible lock member, wherein the second pole segment has a second collapsible lock member adjacent the proximal end thereof, wherein the utility power line pole further includes a third pole segment also having a proximal third pole end, a distal third pole end, an outer third pole segment surface, and an inner third pole segment surface positioned such that the third pole segment receives at least portions of the second pole segment within the tubular portions of the third pole segment, wherein the third pole segment further has a second pole opening positioned adjacent the distal third pole end thereof and positioned to receive the second collapsible lock member of the second pole segment when in the extended position, and wherein the second alignment indicator on the outer second pole segment surface is positioned to continuously visibly indicate to the user a radial position of the second collapsible lock member when the at least portions of the second pole segment are positioned within the third pole segment and not visible to the user to thereby assist the user in maintaining continuous alignment of the second collapsible lock member with the third pole opening during extension of the second pole segment from within the third pole segment to lock the second pole segment with the third pole segment when in the extended position.

11. A portable utility power line pole of claim 10, wherein the outer third pole segment surface further includes a third alignment indicator positioned thereon, and wherein the second and third alignment indicators further align with each other to further enhance ease of alignment to readily align the second collapsible lock member with the third pole opening during extension of the second pole segment from within the third pole segment.

12. A portable utility power line pole of claim 11, wherein the first, second, and third alignment indicators align with each other to further define the visible line that extends substantially the lengthwise extent of the utility power line pole to further enhance the ease of alignment to provide the user continuous visualization of the orientation of the utility power line tool when manipulating the portable utility power line pole adjacent the proximal body end of the power line pole body.

13. A portable utility power line pole of claim 9, wherein the power line tool connector is positioned such that the utility power line tool is vertically aligned with the visible line when positioned thereon.

14. A portable utility power line pole comprising:
a power line pole body adapted to be positioned between an extended position and a retracted position, adapted to be held in the hand of a user, and having a proximal body end, a distal body end, and a plurality of collapsible and telescoping tubular shaped pole segments therebetween, the plurality of the collapsible and telescoping tubular shaped pole segments including:
a first pole segment having a proximal first pole segment end, a distal first pole segment end, and an outer first pole segment surface and an inner first pole segment surface extending therebetween, and adapted to mount a utility power line tool connector to the distal first pole end thereon, and
a second pole segment having a proximal second pole end, a distal second pole end, an outer second pole segment surface and an inner second pole segment surface extending therebetween, the inner second pole segment surface positioned such that the second pole segment receives at least portions of the first pole segment within the tubular portions of the second pole segment so that portions of the inner second pole segment surface substantially surround portions of the outer first pole segment surface when the first pole segment is collapsed in the retracted position;
means for connecting the proximal first pole segment end of the first pole segment to the distal second pole segment end of the second pole segment; and
an alignment indicator positioned on the outer pole segment surface of the first pole segment to visibly indicate to the user a radial position of the means for connecting the proximal first pole segment end to the distal second pole segment end when the at least portions of the first pole segment are positioned within the second pole segment and not readily visible to the user to thereby assist the user in maintaining continuous alignment of the means for connecting the proximal first pole end to the distal second poll end during extension of the first pole segment from within the second pole segment to lock the first pole segment with the second pole segment when in the extended position.

15. A portable utility power line pole of claim 14, wherein the alignment indicator on the first pole segment is a first alignment indicator and the second pole segment further includes a second alignment indicator positioned thereon, and wherein the first and second alignment indicators align with each other to define a visible line that extends substantially the lengthwise extent of the utility power line pole.

16. A portable utility power line pole of claim 15, further comprising the utility power line tool connector adapted to mount a utility power line tool and connected to the distal first pole end of the first pole segment of the power line pole body, and wherein the visible line extending substantially the lengthwise extent of the utility power line pole aligns with the user selected orientation of the utility power line tool when mounted on the utility power line tool connector to provide the user visualization of the orientation of the utility power line tool when the first and second pole segments are in the extended position and when the user manipulates the portable utility power line pole adjacent the proximal body end of the power line pole body.

17. A portable utility power line pole of claim 16, wherein the means for connecting the proximal first pole segment end to the distal second pole segment end includes a first collapsible lock member positioned adjacent the proximal first pole end and a second pole opening positioned adjacent the distal second pole end thereof.

18. A portable utility power line pole of claim 16, further comprising a third pole segment having a proximal third pole end, a distal third pole end, an outer third pole segment surface, and an inner third pole segment surface positioned to receive at least portions of the second pole segment within the tubular portions of the third pole segment, and means for connecting the proximal second pole segment end of the second pole segment to the distal third pole segment end of the third pole segment, and wherein the second alignment indicator is further positioned on the outer second pole segment surface to visibly indicate to the user a radial position of the means for connecting the proximal second pole segment end to the distal third pole segment end when the at least portions of the second pole segment are positioned within the third pole segment and not readily visible to the user to thereby assist the user in maintaining continuous alignment of the means for connecting the proximal second pole end to the distal third pole end during extension of the second pole segment from within the third pole segment to lock the second pole segment with the third pole segment when in the extended position.

19. A portable utility power line pole of claim 18, wherein the means for connecting the proximal first pole segment end to the distal second pole segment end includes a first collapsible lock member positioned adjacent the proximal first pole end and a second pole opening positioned adjacent the distal second pole end thereof, wherein the means for connecting the proximal second pole segment end to the distal third pole segment end includes a second collapsible lock member positioned adjacent the proximal second pole end and a third pole opening positioned adjacent the distal third pole end thereof, wherein the outer third pole segment surface includes a third alignment indicator positioned thereon, and wherein the second and third alignment indicators further align with each other as well to extend the length of the visible line to further enhance ease of alignment to readily align the second collapsible lock member with the third pole opening during extension of the second pole segment from within the third pole segment.

20. A portable utility power line pole of claim 19, wherein the first, second, and third alignment indicators align with each other to further define the visible line that extends substantially the lengthwise extent of the utility power line pole to further enhance the ease of alignment to provide the user continuous visualization of the orientation of the utility power line tool when manipulating the portable utility power line pole adjacent the proximal body end of the power line pole body.

21. A portable utility power line pole of claim 20, wherein the power line tool connector is positioned such that the utility power line tool is vertically aligned with the visible line when positioned thereon.

22. A portable utility power line pole of claim 18, wherein the outer third pole segment surface includes a third alignment indicator positioned thereon, and wherein the second and third alignment indicators further align with each other as well to extend the length of the visible line to further enhance ease of alignment to provide the user continuous visualization of the orientation of the utility power line tool when manipulating the portable utility power line pole at the proximal body end of the portable utility power line pole.

23. A portable utility power line pole comprising:
a utility power line pole body adapted to be held in the hand of a user and having a proximal pole body end, a distal pole body end, and an outer pole body surface;
a utility power line tool connector housing connected to the distal pole body end and having a proximal tool connector housing end, a distal tool connector housing end, and an outer tool connector housing surface and an inner tool connector housing surface extending therebetween, and a tool connector housing chamber positioned between the proximal and distal tool connector housing ends and the inner tool connector housing surface and positioned to receive at least a portion of the distal pole body end therein so that portions of the inner tool connector housing surface adjacent the proximal tool connector housing end substantially surround portions of the distal pole body end;
a utility power line tool connector housed within the utility power line tool connector housing, adapted to mount a utility power line tool thereon for use in association with electrical power distribution lines, and including a retractable and extendable hook member adapted to be positioned between an open hook position and a closed hook position such that the hook member is substantially positioned within the tool connector housing chamber when in a retracted and closed hook position and extends outwardly from the tool connector housing chamber when in an extended and open hook position;
a hook controller connected between the proximal end of the pole body and the hook member and responsive to the user of the portable utility power line pole to extend and to retract the hook member in a plane parallel with a plane passing between the alignment indicator and center of the utility power line pole body; and
an alignment indicator positioned on the outer pole body surface and aligning with a user selected orientation of the hook member to provide the user continuous visualization of an orientation of the hook member when manipulating the portable utility power line pole at the proximal pole body end.

24. A portable utility power line pole of claim 23, wherein the alignment indicator is in the form of a visible line that extends substantially the lengthwise extent of at least the visible extents of the outer pole body surface.

25. A portable utility power line pole of claim 24, wherein the hook member extends outwardly away from the alignment indicator when in an extended and open hook position.

26. A portable utility power line pole of claim 23, further comprising a second utility power line tool connector adapted to mount a second utility power line tool for use in association with electrical power distribution lines and connected to the proximal pole body end of the pole body, and wherein the alignment indicator also aligns with the user selected orientation of the second utility power line tool connector to provide the user visualization of the orientation of the second utility power line tool when mounted to the second utility power line tool connector and when the user is manipulating the portable utility power line pole at the distal pole body end.

27. A method for assembling a portable utility power line pole adapted to be held in the hand of a user for use in association with electrical power distribution lines comprising the steps of:
providing a power line pole body including a plurality of collapsible and telescoping tubular shaped pole segments, a first pole segment prepositioned within a second pole segment having an inner second pole segment surface positioned such that a proximal first pole end of the first pole segment is collapsed in a retracted position into a distal second pole end of the second pole segment, the first and second pole segments having respective first and second alignment indicators positioned on an outer pole segment surface of each of the first and second pole segments and which form a pair of adjacent alignment indicators, at least one of the first and second alignment indicators extending substantially the lengthwise extent of the respective first and second outer pole segment surfaces; and connecting a collapsible lock member positioned adjacent the proximal first pole end of the first pole segment and in alignment with the alignment indicator of the first outer pole segment surface through a distal second pole opening positioned adjacent the distal second pole end of the second pole segment and in alignment with the second alignment indicator of the second outer pole segment surface by extending the first pole segment from the retracted position within the second pole segment while viewing the pair of alignment indicators to maintain continuously alignment of the collapsible lock member with the opening in the distal second pole end of the second pole segment during such extension.

28. A portable method of claim 27, wherein the first and second alignment indicators are each in the form of a visible line that extends substantially the lengthwise extent of at least visible extents of the respective outer pole segment surface.

29. A method for using a portable utility power line pole on electrical power distribution lines comprising the steps of:

providing an assembled portable utility power line pole adapted to be held in the hand of a user and comprising a pole body having a distal pole body end, a power line tool connector connected to the distal pole body end and adapted to mount a power line tool for use in association with electrical power distribution lines, and an alignment indicator positioned on an outer pole body surface of the pole body in alignment with the power line tool connector to provide the user continuous visualization of a user selected orientation of the power line tool when mounted on the power line tool connector and when the user manipulates the portable utility power line pole at a proximal pole body end of the pole body to select the orientation of the power line tool;

mounting the power line tool to the power line tool connector in alignment with the alignment indicator to provide the user visualization of the orientation of the power line tool when manipulating the portable utility power line pole; and manipulating the portable utility power line pole while viewing the alignment indicator at the proximal pole body end of the pole body to maintain continuous visualization of the orientation of the utility power line tool at the distal pole body end of the portable utility power line pole.

30. A portable method of claim 29, wherein the alignment indicator is in the form of a visible line that extends substantially the lengthwise extent of at least the visible extents of the outer pole body surface.

* * * * *